H. W. PATRICK.
STERILIZING DEVICE.
APPLICATION FILED JULY 5, 1910.

974,514.

Patented Nov. 1, 1910.

Witnesses
Edgar A. Spurr
A. L. Webster

Inventor
Henry W. Patrick
By J. O. Richey
His Attorney

UNITED STATES PATENT OFFICE.

HENRY W. PATRICK, OF ELYRIA, OHIO.

STERILIZING DEVICE.

974,514.   Specification of Letters Patent.   Patented Nov. 1, 1910.

Application filed July 5, 1910. Serial No. 570,250.

*To all whom it may concern:*

Be it known that I, HENRY W. PATRICK, a citizen of the United States, residing at Elyria, county of Lorain, and State of Ohio, have invented certain new and useful Improvements in Sterilizing Devices; and I do hereby declare the following to be a full, clear, and exact description of the invention, such as will enable others skilled in the art to which it appertains to make and use the same.

My invention relates to devices for sterilizing drinking cups or the like and is more particularly adapted for use at public drinking places, where it is desirable to sterilize each cup before it is used. I aim to produce a device, which will accomplish this with as little trouble to the drinker as possible.

My invention will be best understood by reference to the following description when taken in connection with the accompanying illustration showing one specific embodiment thereof, while its scope will be more particularly pointed out in the appended claims.

Figure 1:
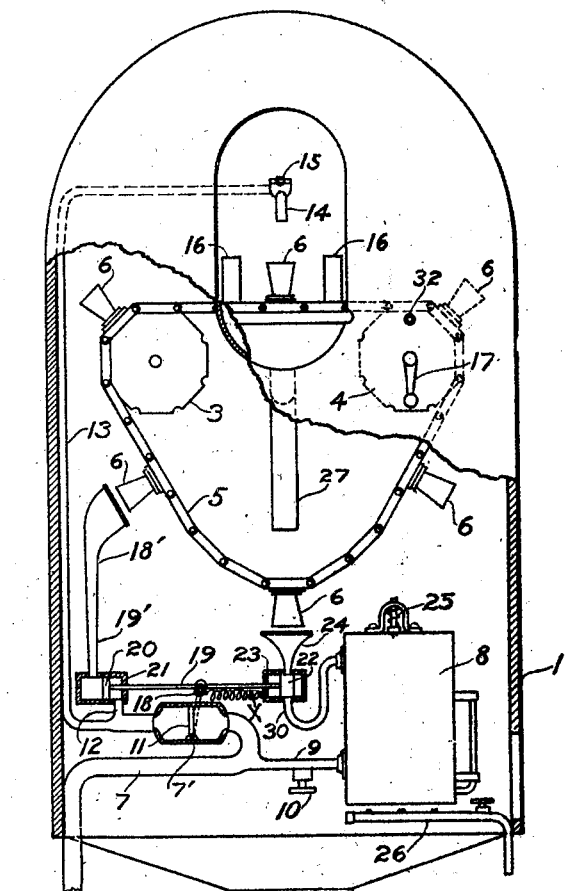
Figure 2:
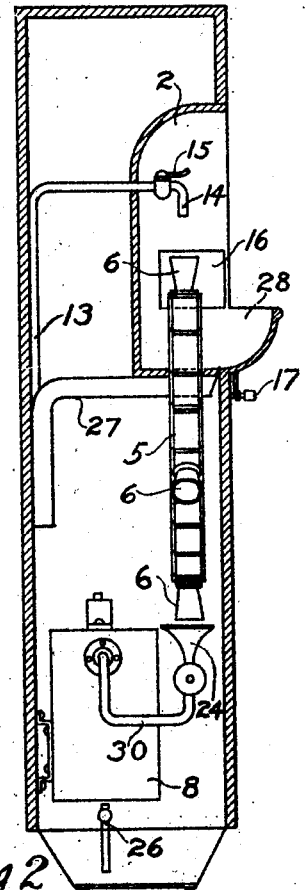
Figure 3:
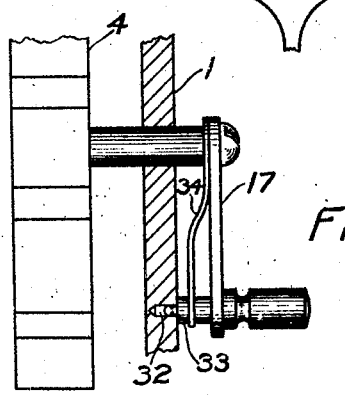
Figure 4:
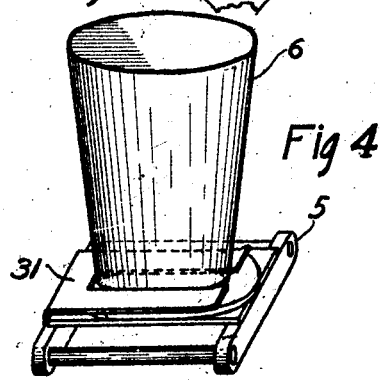

Figure 1 is a front elevation, partly sectional, of my device. Fig. 2 is a vertical section. Figs. 3 and 4 are detailed views.

Referring now to the drawing and the embodiment of my invention there shown, I have illustrated at 1, a casing. A chamber 2, is shown in the upper part of this casing. Sprocket wheels 3 and 4 are shown pivoted to the casing. A sprocket chain 5 is connected to these wheels and is adapted to move thereover. This chain serves as a conveyer for cups 6, which are removably attached thereto by the spring clips 31. To one of the sprocket wheels, I attach a small crank, 17, which projects outside the front of the casing to rotate the sprocket wheel 4, and is adapted to be operated by the drinker to move a cup to a position where it is accessible to him. A liquid duct 7, leads into the casing from an outside reservoir.

At 8 I show a steam boiler, which is connected by pipe 9 to the duct 7. A valve 10 controls the flow of water from the pipe into the boiler. I admit water through this pipe to the boiler to be converted into steam for sterilizing purposes. The pipe 7 is expanded at 7' and a valve 11, pivoted in this expanded portion. A spring X is connected through a lever 18 to the valve 11 tending to hold it in closed position. When the valve 15 is opened, the water flowing in the pipe overcomes the pressure of this spring opening the valve. When 15 is closed the valve encounters the static pressure alone, and the force of the spring is sufficient to close the same. At 12 I show a second pipe leading from the duct 7 into a valve box 21. The duct 7 is continued at 13 to a spigot 14. The flow of liquid through this spigot is controlled by the hand operated valve 15. A spring pressed lever 18, connects the valve 11 to a rod 19. On one end of this rod is a piston valve 20, which works in the valve box 21. At 18' I show a device for admitting cold water to cool the sterilized cup. This device is connected by a duct 19' to the valve box 21. On the other end of the rod 19, I show a similar valve which works in a valve box 23. The valve box 23 is connected by a duct 30, to the steam boiler 8. Mounted upon the top of the box 23, is a funnel shaped device 24 adapted to conduct the steam from the valve box to the cup to be sterilized.

25 is a safety valve for the boiler.

At 26 I show means for converting the water in the boiler into steam. In the form shown, I show a gas pipe and burner. 27 is a duct for conveying away the waste water which is cast thereinto through an opening 28 in the frame. The frame 1, has a recess at 32 in which a pin 33, on the crank 17 catches. This pin is spring pressed to enter this recess by spring 34.

At 16 I show openings in the chamber 2, through which the cups are carried by the conveyer. The drinker operates the valve 15 to draw water into the cup 6. The flow of water through the duct 7 and 13 opens the valve 11, which operating through the lever 18, and the rod 19, moves the piston heads 21 and 22 to the left hand positions opening the valve in the boxes 21 and 23, so that steam passes from the boiler 8 through the pipe 30 and a funnel 24 into the cup 6. Cold water passes from the pipe 13 through 12, 19' and 18' to a second cup which has previously been sterilized to cool the same. When the drinker has finished, the cup is placed upon the conveyer and the crank 17 rotated moving it to the next position and moving the next cup, which has been sterilized to the position in front of the spigot. The drinker may perform the operation of changing the position of the cups before he drinks if desired.

While I have shown this particular form and have described this particular mode of operation, it will be obvious to those skilled in the art, that numerous and extensive departures from the forms and details of the apparatus here shown, may be made without departing from the spirit of this invention. The form shown and the mode of operation described, being here presented solely for the purpose of illustrating this invention.

I claim—

1. In a device of the class described, the combination of a liquid receptacle, a duct for conducting liquid to said receptacle and means introducing a sterilizing medium to said receptacle, whereby the same is sterilized, said last named means being under the control of the liquid in said duct.

2. In a device of the class described, the combination of a liquid receptacle, a duct for conducting liquid to said receptacle, means controlling the flow of liquid in said duct, means for introducing a sterilizing medium into said receptacle to sterilize the same and a valve in said duct controlling said last named means, said valve being operated by the flow of liquid in the duct.

3. In a device of the class described, the combination of a plurality of liquid receptacles, a duct for conducting liquid to said receptacles, a valve in said duct controlled by the flow of liquid therein, a second duct adapted to convey a sterilizing medium to one of said receptacles and a valve mounted in said second duct, said second valve being controlled by said first valve to open said second duct to permit the flow of the sterilizing medium when there is a movement of liquid in the first named duct.

4. In a device of the character described, the combination of a plurality of liquid receptacles, a conveyer upon which the same may be mounted and moved to each of several positions, a duct adapted to convey liquid to one of said positions to a receptacle thereat, a second duct adapted to convey a sterilizing medium to a second of said positions to sterilize a receptacle thereat and means governed by the flow of fluid in the first named duct controlling the conveyance of the sterilizing medium through the second duct.

5. In a device of the character described, the combination of a plurality of liquid receptacles, a conveyer upon which the same may be mounted and moved to each of several positions, a duct adapted to convey liquid to one of said positions to a receptacle thereat, a second duct adapted to convey a sterilizing medium to a second of said positions to sterilize a receptacle thereat, and a valve in said first named duct controlled by the flow of liquid therein, said valve governing the introduction of the sterilizing medium to the receptacles.

6. In a device of the character described, the combination of a plurality of liquid receptacles, a conveyer upon which the same may be mounted and moved to each of several positions, a duct adapted to convey liquid to one of said positions to a receptacle thereat, a second duct adapted to convey a sterilizing medium to a second of said positions to sterilize a receptacle thereat, a valve in said first named duct controlled by the liquid therein and a valve in the second named duct controlling the flow of the sterilizing medium therein, said first named valve controlling said last named valve.

7. In a device of the class described, a plurality of receptacles, a conveyer adapted to carry said receptacles to each of several positions, means for fastening said receptacles to said conveyer and means to operate said conveyer to move said receptacles from position to position, a duct for conducting a liquid to one of said positions to introduce the same into a receptacle at that position, a valve in said duct controlling the flow of liquid therein, a second valve in said duct controlled by the flow of liquid in said duct, a second duct adapted to convey a sterilizing medium to another position to introduce the same into a second of said receptacles located at a second of said positions and means in said second duct controlling the flow of sterilizing medium therein, said last named means being under control of said last named valve.

8. In a device of the class described, the combination of a drinking cup, means to fill said cup, a device for introducing a sterilizing medium into said cup to sterilize the same and means to cool said cup after sterilization.

9. In a device of the class described, the combination of a drinking cup, a duct for conveying a liquid to said cup, a valve adapted to be manually operated to permit or prevent the flow of liquid to said cup, means for introducing a sterilizing medium into said cup, means to cool said cup after sterilization and means to convey said cup to each of said means.

10. In a device of the class described, the combination of a plurality of drinking cups, means to convey said cups from one position to another, a duct for conveying a liquid to one of said cups to fill the same, means at a second of said positions for introducing a cooling liquid into a cup and a valve in said last named means controlled by the liquid in said duct.

In testimony whereof, I affix my signature in the presence of two witnesses.

HENRY W. PATRICK.

Witnesses:
 EDGAR A. SPURR,
 FRANK WILFORD.